United States Patent
Komatsu et al.

(10) Patent No.: US 6,972,915 B2
(45) Date of Patent: Dec. 6, 2005

(54) METHOD OF MAGNETIC TRANSFER USING A SIDE-SUPPORTED SLAVE MEDIUM DIRECTLY OPPOSED TO THE MAGNETIC FIELD GENERATOR

(75) Inventors: Kazunori Komatsu, Kanagawa-ken (JP); Masashi Aoki, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 157 days.

(21) Appl. No.: 10/370,477

(22) Filed: Feb. 24, 2003

(65) Prior Publication Data

US 2003/0161060 A1   Aug. 28, 2003

(30) Foreign Application Priority Data

Feb. 25, 2002   (JP) .............................. 2002-048118

(51) Int. Cl.[7] .............................................. G11B 5/86
(52) U.S. Cl. ............................. 360/17; 360/15; 360/16
(58) Field of Search ............................... 360/15, 16, 17

(56) References Cited

U.S. PATENT DOCUMENTS

| | | | |
|---|---|---|---|
| 5,121,258 A | | 6/1992 | Chi et al. |
| 6,347,016 B1 | | 2/2002 | Ishida et al. |
| 6,433,944 B1 | * | 8/2002 | Nagao et al. ................. 360/16 |
| 2002/0054442 A1 | * | 5/2002 | Nishikawa ................... 360/17 |
| 2002/0186486 A1 | * | 12/2002 | Nishikawa et al. ........... 360/17 |
| 2003/0002182 A1 | * | 1/2003 | Kamatani et al. ............. 360/17 |
| 2003/0048557 A1 | * | 3/2003 | Nishikawa et al. ........... 360/17 |
| 2003/0184895 A1 | * | 10/2003 | Niitsuma et al. ............. 360/17 |
| 2003/0189775 A1 | * | 10/2003 | Komatsu et al. ............. 360/17 |
| 2004/0114264 A1 | * | 6/2004 | Nishikawa ................... 360/16 |

FOREIGN PATENT DOCUMENTS

| | | |
|---|---|---|
| JP | 63-183623 | 7/1988 |
| JP | 2001-14667 | 1/2001 |
| JP | 2001143258 A | 5/2001 |

* cited by examiner

*Primary Examiner*—David Hudspeth
*Assistant Examiner*—Adam R. Giesy
(74) *Attorney, Agent, or Firm*—Sughrue Mion, PLLC (57) ABSTRACT

Information represented by a pattern of a magnetic layer formed on a master information carrier is magnetically transferred to a slave. An initial DC magnetic field is applied to the slave medium with the slave medium supported from one side thereof so that the other side of the slave medium is directly opposed to the magnetic field generator, and a transfer magnetic field is applied to the slave medium and the master information carrier held in close contact with each other by a holder, which covers both the sides of the slave medium/master information carrier assembly, with the magnetic field generator positioned to oppose both the sides of the slave medium/master information carrier assembly so that the magnetic field generated by the magnetic field generator is applied to the slave medium and the master information carrier through the holder.

7 Claims, 6 Drawing Sheets

METHOD OF MAGNETIC TRANSFER USING A SIDE-SUPPORTED SLAVE MEDIUM DIRECTLY OPPOSED TO THE MAGNETIC FIELD GENERATOR

BACKGROUND OF THE INVENTION

1. Field of the Invention

This invention relates to a method of magnetic transfer for transferring information to a magnetic recording medium (slave medium) from a master information carrier carrying thereon a magnetic layer pattern representing the information to be transferred to the magnetic recording medium.

2. Description of the Related Art

With an increase in information quantity, there is a demand for a magnetic recording medium which is high in capacity, low in cost and preferably requires a short time to read out a necessary part of data (a magnetic recording medium which allows so-called high-speed access). As an example of such a magnetic recording medium, there has been known a high recording density magnetic medium such as a hard disc or a flexible disc. To realize the high capacity, so-called servo tracking technology for causing a magnetic head to accurately trace narrow data tracks plays an important role. To perform the servo tracking, a servo tracking signal, an address information signal, a reproduction clock signal and the like are recorded on the disc at certain intervals as so-called preformat.

As a method of recording the preformat accurately and efficiently, there has been proposed, for instance, in Japanese Unexamined Patent Publication Nos. 63(1988)-183623, U.S. Pat. No. 6,347,016, a magnetic transfer method in which a pattern which is formed on a master information carrier and represents servo information is copied to a magnetic recording medium (a slave medium) by magnetic transfer.

In the magnetic transfer, a master information carrier having thereon an irregularity pattern (a pattern of protruding portions and recessed portions) representing information (e.g., servo information) to be transferred to a slave medium (a magnetic recording medium such as a magnetic disc) and a magnetic layer formed at least on the protruding portions is brought into a close contact with the slave medium and a transfer magnetic field is applied to the master information carrier and the slave medium in a close contact with each other, whereby a magnetization pattern corresponding to the information represented by the irregularity pattern is magnetically transferred from the master information carrier to the slave medium. Accordingly, the information carried by the master information carrier can be statically recorded on the slave medium with the relative position between the master information carrier and the slave medium kept constant. Thus, according to the magnetic transfer, the preformat recording can be performed accurately and the time required for the preformat recording is very short.

We, this applicant, have proposed in Japanese Unexamined Patent Publication No. 2001-14667 a method of magnetic transfer in which the magnetic layer of the slave medium is initially magnetized in one direction of the recording tracks and a transfer magnetic layer is applied to the slave medium in the direction opposite to the direction of the initial-magnetization with the slave medium held in close contact with the master information carrier. By this method, a very good magnetic transfer can be effected.

The intensity of the transfer magnetic field should be substantially the same as the coercive force Hc of the slave medium and the intensity of the initial DC magnetic field should be stronger than that of the transfer magnetic field and preferably not weaker than about twice the intensity of the transfer magnetic field (i.e., the coercive force Hc of the slave medium).

At present, the coercive force Hc of the slave medium tends to increase under the demands for magnetic recording medium of higher capacity, higher recording/reproducing accuracy or the like. As the coercive force Hc of the slave medium becomes stronger, it is necessary to increase the intensity of the transfer magnetic field and the initial magnetic field. However since the intensity of a magnetic field generated by a magnetic field generator is limited, it is important how to efficiently use a magnetic field of an intensity which can be currently generated.

SUMMARY OF THE INVENTION

In view of the foregoing observations and description, the primary object of the present invention is to provide an improved method of magnetic transfer in which the initial DC magnetic field and the transfer magnetic field can be efficiently applied to the slave medium.

In accordance with the present invention, there is provided a method of magnetic transfer for magnetically transferring information represented by a pattern of a magnetic layer formed on a master information carrier to a magnetic layer of a slave medium comprising the steps of applying an initial DC magnetic field to the slave medium by a magnetic field generator to initially magnetize the magnetic layer of the slave medium in one direction of recording tracks and applying a transfer magnetic field to the slave medium and the master information carrier by a magnetic field generator in the direction opposite to the direction of the initial-magnetization with the initially-magnetized magnetic layer of the slave medium held in close contact with the magnetic layer on the master information carrier, wherein the improvement comprises that the initial DC magnetic field is applied to the slave medium with the slave medium supported from one side thereof so that the other side of the slave medium is directly opposed to the magnetic field generator, and the transfer magnetic field is applied to the slave medium and the master information carrier held in close contact with each other so that the initially-magnetized magnetic layer of the slave medium held in close contact with the magnetic layer on the master information carrier by a holder, which covers both the sides of the slave medium/master information carrier assembly, with the magnetic field generator positioned to oppose both the sides or one side of the slave medium/master information carrier assembly so that the magnetic field generated by the magnetic field generator is applied to the slave medium and the master information carrier through the holder.

That is, in accordance with the present invention, the transfer magnetic field is applied to the slave medium through the holder by the magnetic field generator and the initial DC magnetic field is directly applied to the slave medium without a holder intervening between the magnetic field generator and the slave medium.

The slave medium may be provided with the magnetic layer on one side thereof or on both the sides thereof. When the slave medium is provided with the magnetic layer on both the sides and information is to be transferred on both the sides of the slave medium at one time, the "slave medium/master information carrier assembly" comprises a slave medium and a pair of master information carriers on the respective sides of the slave medium.

The expression "to transfer information" means to pattern the arrangement of magnetization of the magnetic layer of the slave medium according to the information.

The intensity of the initial DC magnetic field is preferably not lower than the coercive force of the magnetic layer of the slave medium, more preferably not lower than 1.2 times the coercive force of the same and most preferably not lower than about twice the coercive force of the same.

The intensity of the transfer magnetic field is preferably not lower than about 0.6 times the coercive force of the magnetic layer of the slave medium and not higher than about 1.3 times the coercive force of the magnetic layer of the slave medium.

As the magnetic field generator for applying the initial DC magnetic field and the transfer magnetic field, for instance, an electromagnet unit or a permanent magnet unit may be employed.

In accordance with the method of magnetic transfer of the present invention, since the initial DC magnetic field is directly applied to the slave medium without a holder intervening between the magnetic field generator and the slave medium, the magnetic field generator can be disposed in the vicinity of the surface of the slave medium and a sufficiently strong magnetic field can be applied to the magnetic layer of the slave medium. This is especially useful when the coercive force of the slave medium is strong and an initial DC magnetic field whose intensity is not weaker than about twice the coercive force of the slave medium is to be applied to the slave medium. Whereas, since the slave medium and the master information carrier(s) are held in close contact with each other by the holder when the transfer magnetic field is applied, the transfer magnetic field can be uniformly applied to the slave medium/master information carrier assembly.

DESCRIPTION OF THE PREFERRED EMBODIMENTS

A pair of pieces of information are transferred to opposite sides (upper and lower sides $2b$ and $2c$) of a slave medium (magnetic recording medium) 2 by a method of magnetic transfer in accordance with a first embodiment of the present invention from a pair of master information carriers 3 and 4. The slave medium 2 is a disc-like magnetic recording medium such as a hard disc, a flexible disc or the like. That is, in this particular embodiment, the slave medium 2 is a double-sided magnetic recording medium comprising a disc-like base sheet and magnetic layers formed on upper and lower sides $2b$ and $2c$ of the base sheet.

Figure 3:
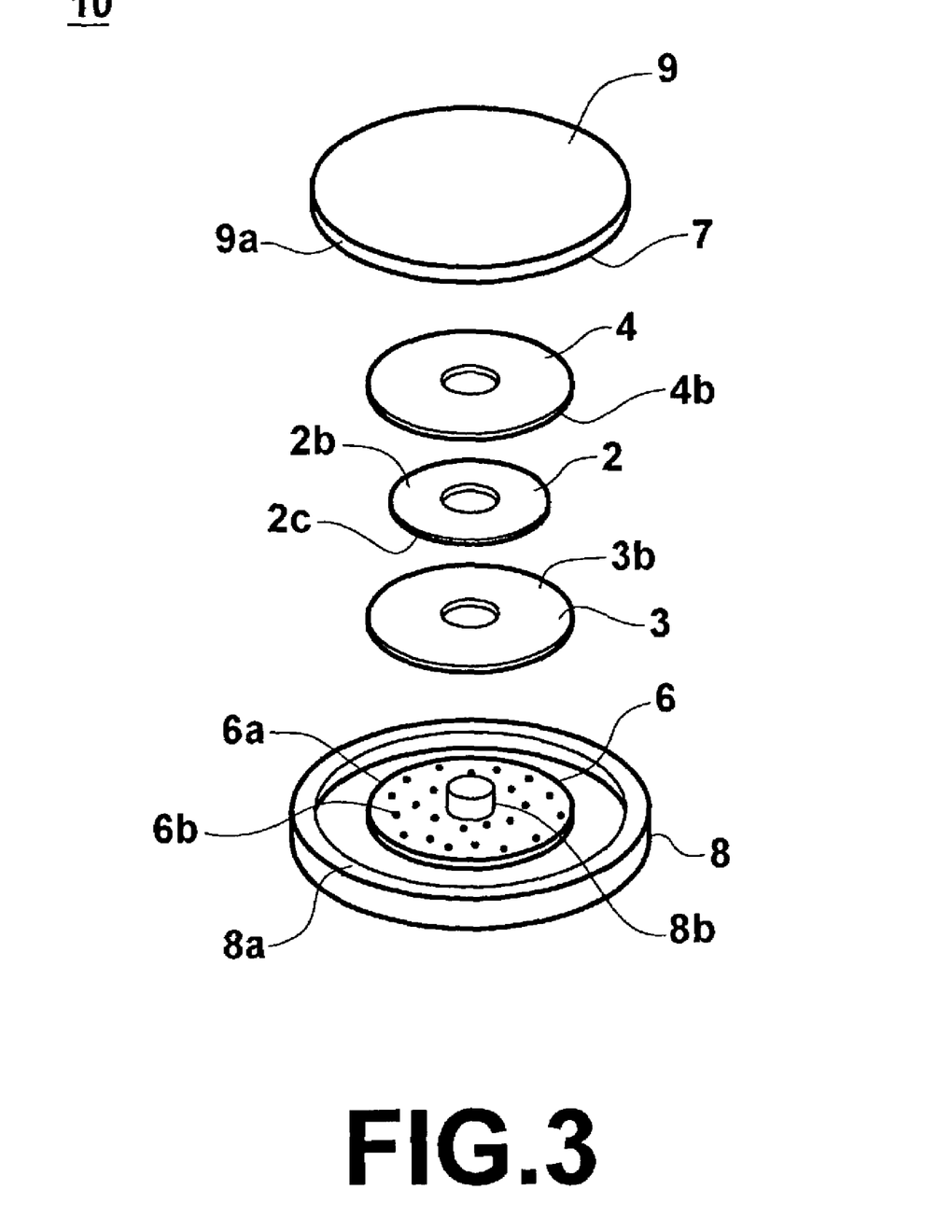
FIG. 3 is an exploded perspective view of the holder.

As shown in FIG. 3, the master information carriers 3 and 4 are like a disc in shape and comprises substrates $3a$ and $4a$ having on their one sides irregularity patterns (patterns of protruding portions and recessed portions) representing information to be transferred to the magnetic layers of the magnetic recording media (slave media) and soft magnetic layers $3b$ and $4b$ provided on the surface of the substrates $3a$ and $4a$. The irregularity patterns respectively carried by the master information carriers 3 and 4 represent information to be transferred to the lower magnetic layer $2c$ and the upper magnetic layer $2b$ of the slave medium 2. The information carried by the master information carriers 3 and 4 may be transferred to opposite sides $2b$ and $2c$ of the slave medium 2 either simultaneously or in sequence.

Figure 1:
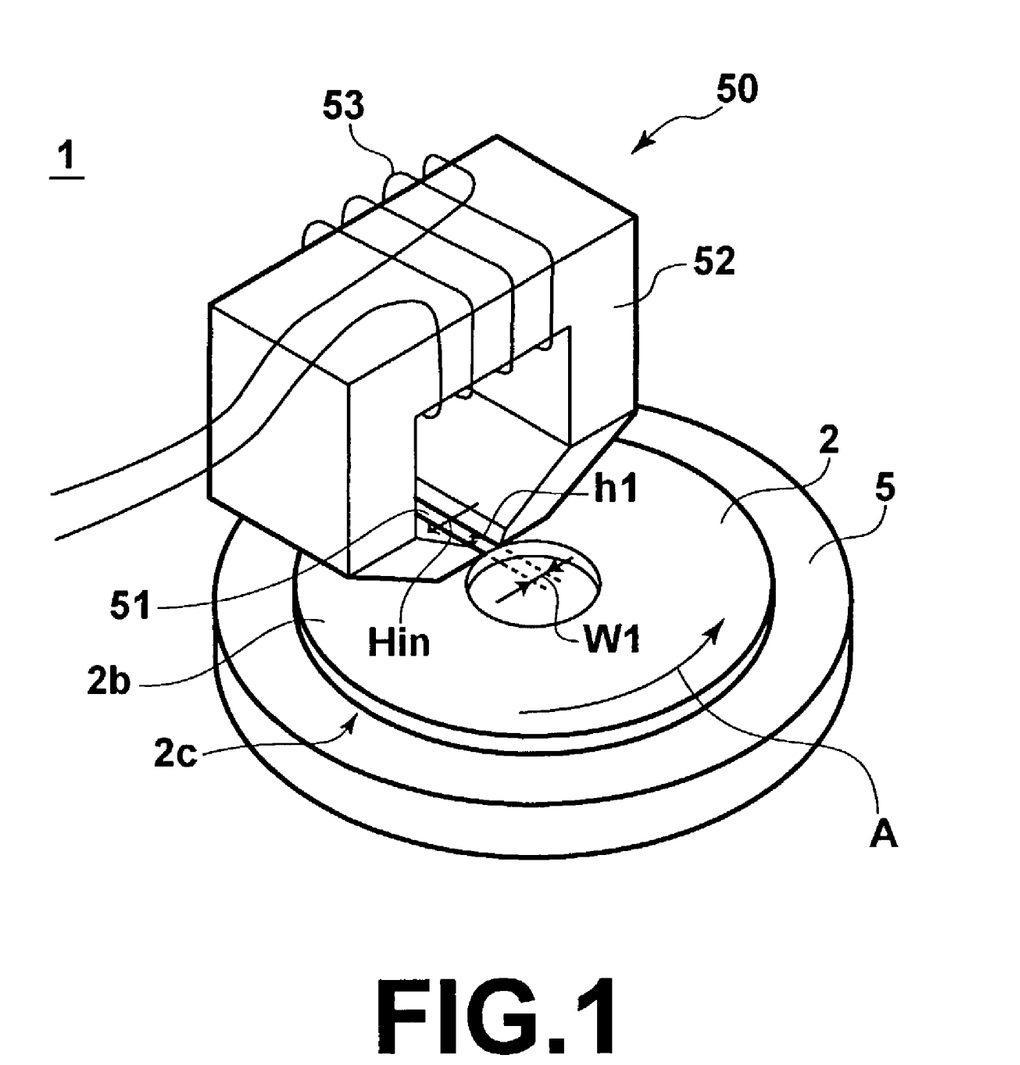
FIG. 1 is a fragmentary perspective view showing an important part of the initial magnetization system employed in a magnetic transfer apparatus for carrying out a method of magnetic transfer in accordance with a first embodiment of the present invention.

The slave medium 2 is first applied with an initial DC magnetic field Hin by an initial magnetization system 1 shown in FIG. 1 and the magnetic layer $2c$ and/or $2b$ of the slave medium 2 is initially magnetized in one direction of recording tracks. The initial magnetization system 1 shown in FIG. 1 comprises a support table 5 which supports the slave medium 2 from the lower side $2c$ thereof, an electromagnet unit 50 held in the vicinity of the upper side $2b$ of the slave medium 2, and a rotating means (not shown) which rotates the support table 5 relatively to the electromagnet unit 50 in the direction of arrow A. In this initial magnetization system 1, the slave medium 2 is directly opposed to the magnetic poles of the electromagnet unit 50, and accordingly, the magnetic field generated by the electromagnet unit 50 is directly applied to the slave medium 2.

The electromagnet unit 50 comprises a core 52 having a gap 51 which radially extends at least from an innermost track to an outermost track of the slave medium 2 and a winding 53 wound around the core 52.

The electromagnet unit 50 generates an initial DC magnetic field Hin across the gap 51 in parallel to the direction of the recording tracks. Accordingly, by rotating the slave medium 2 once or more relatively to the initial DC magnetic field Hin, the initial DC magnetic field Hin parallel to the concentric recording tracks can be applied to over the entire recording track area.

In this particular embodiment, the width w1 of the gap 51 is set to be not larger than half of the radius of the innermost recording track and the distance h1 between the gap 51 and the upper surface of the slave medium is set to be not larger than 5 mm (preferably 3 mm) so that the initial DC magnetic field applied to the slave medium is not weaker than twice the coercive force of the magnetic layer of the slave medium 1 on both the sides of the slave medium 2. For example, when the radius of the innermost recording track is 20 mm, the width w1 of the gap 51 is set to be not larger than 10 mm (preferably not larger than 5 mm).

Figure 2:
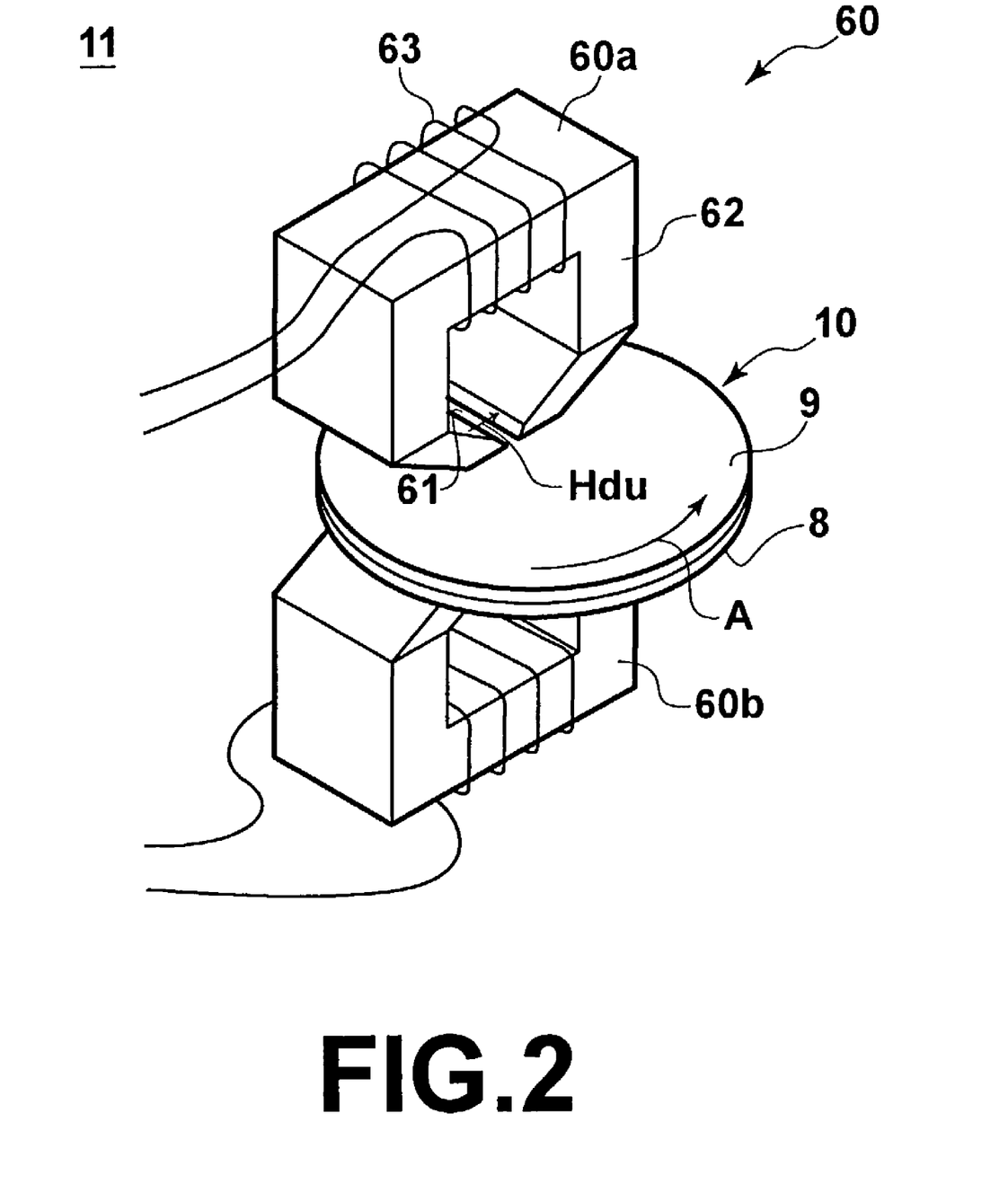
FIG. 2 is a fragmentary perspective view showing an important part of the transfer magnetic field application system of a magnetic transfer apparatus for carrying out a method of magnetic transfer in accordance with a second embodiment of the present invention.

After the magnetic layers on the upper and lower sides $2b$ and $2c$ are thus initially magnetized, the slave medium 2 together with the lower and upper master information carriers 3 and 4 held in close contact with the lower and upper side of the slave medium 2 is applied with a transfer magnetic field Hdu (FIG. 2) by a transfer magnetic field application system 11 shown in FIG. 2. The transfer magnetic field application system 11 comprises a holder 10 which holds the slave medium 2 and the master information carriers 3 and 4 in close contact with each other covering the upper and lower sides of the slave medium/master information carrier assembly, a magnetic field generator 60 having upper and lower electromagnet units 60a and 60b respectively opposed to the upper and lower sides 2b and 2c of the slave medium 2 and a rotating means (not shown) which rotates the holder 10 in the direction of arrow A relatively to the magnetic field generator 60. That is, in this transfer magnetic field application system 11, the slave medium 2, and the master information carriers 3 and 4 are accommodated in the holder 10, and the transfer magnetic field Hdu is applied to the slave medium 2, and the master information carriers 3 and 4 through the holder 10.

Each of the upper and lower electromagnet units 60a and 60b of the magnetic field generator 60 comprises a core 62 having a gap 61 which radially extends at least from an innermost track to an outermost track of the slave medium 2 and a winding 63 wound around the core 62, and the upper and lower electromagnet units 60a and 60b generate magnetic fields parallel to the direction of the tracks in the same directions on opposite sides of the slave medium 2. It is not necessary to provide an electromagnet on each side of the slave medium but an electromagnet may be provided only on one side of the slave medium 2.

In the transfer magnetic field application system 11, the intensity of the transfer magnetic field is set to be not lower than about 0.6 times the coercive force Hc of the magnetic layer of the slave medium and not higher than about 1.3 times the coercive force of the magnetic layer of the slave medium (preferably 0.8 Hc to 1.2 Hc and more preferably 1 Hc to 1.1 Hc) on both the sides of the slave medium 2.

FIG. 3 is an exploded perspective view of the holder 10.

As shown in FIG. 3, the holder 10 comprises a lower holder member 8 having a lower correcting member 6 which holds the lower master information carrier 3, for transferring the information to the lower magnetic layer (the magnetic layer on the lower side 2c) of the slave medium 2, under suction force and forces it flat and an upper holder member 9 having an upper correcting member 7 (the same as the lower correcting member 6 in structure) which holds the upper master information carrier 4, for transferring the information to the upper magnetic layer (the magnetic layer on the upper side 2b) of the slave medium 2, under suction force and forces it flat. The upper and lower holder members 9 and 8 presses the upper and lower master information carriers 4 and 3 respectively against the upper and lower magnetic layers of the slave medium 2 with the centers of the upper and lower master information carriers 4 and 3 and the slave medium 2 aligned with each other, thereby holding the upper and lower master information carriers 4 and 3 and the slave medium 2 in close contact with each other.

The lower and upper master information carriers 3 and 4 are respectively held under suction by lower and upper holder members 8 and 9 on the side opposite to the magnetic layer 3b and 4b carrying thereon the information to be transferred. In order to strengthen the close contact with the slave medium 2, small through holes extending from one side of the master information carrier to the other side may be formed in the master information carrier so that air trapped between the slave medium 2 and the master information carrier is purged therethrough at portions where the through holes do not interfere with the irregularity pattern representing the information to be transferred and do not communicate with suction holes (to be described later) of the correcting members 6 and 7.

The lower correcting member 6 is like a disc in shape and is sized according to the size of the master information carrier 3. The surface of the lower correcting member 6 which is brought into contact with the master information carrier 3 is formed into a suction face 6a whose surface is about 0.01 to 0.1 μm in centerline mean surface roughness Ra. About 25 to 100 suction holes 6b not larger than about 2 mm in diameter uniformly open is the suction face 6a. Though not shown, each of the suction holes 6b is connected to a vacuum pump through a vacuum passage which is led outside the lower holder member 8 through the lower correcting member 6. The back side (opposite to the magnetic layer) of the lower master information carrier 3 is forced flat along the suction face 6a under the suction force applied thereto through the suction holes 6b and thus the flatness of the lower master information carrier 3 is corrected. The upper correcting member 7 is the same as the lower correcting member 6 in structure, and will not be described here.

The lower and upper holder member 8 and 9 are like a disc in shape and one or both of them is movable in the axial direction toward and away from each other. The lower and upper holder member 8 and 9 are opened and closed by an opening/closing mechanism (a pressing mechanism, a fastener mechanism or the like) not shown, and pressed against each other at a predetermined pressure when closed. The lower and upper holder member 8 and 9 are provided with flanges 8a and 9a on their outer peripheries which are brought into abutment against each other to close its inside in an air-tight fashion when the lower and upper holder member 8 and 9 are closed. A locator pin 8 which engages with the central opening of the slave medium 2 to locate the slave medium 2 is erected at the center of the lower holder member 8.

Magnetic transfer of information to the slave medium 2 by a method of magnetic transfer in accordance with a first embodiment of the present invention using the initial magnetization system 1 shown in FIG. 1 and the transfer magnetic field application system 11 shown in FIG. 2 will be described, hereinbelow.

The slave medium 2 is first placed on the support table 5 of the initial magnetization system 1 and an initial DC magnetic field Hin is generated across the gap 51 of the electromagnet unit 50. The magnetic field Hin is parallel to a tangent of the recording tracks, and the initial DC magnetic field is applied to over the entire area of the recording tracks by rotating the support table 5 (or the slave medium 2) relatively to the magnetic field once or more in the direction of arrow A by rotating means (not shown). In order to initially magnetize the upper and lower magnetic layers of the slave medium 2 at one time, it is necessary for the intensity of the magnetic field Hin on the upper and lower sides 2b and 2c of the slave medium 2 to be not weaker than the coercive force Hc of the slave medium 2. When the strength of the magnetic field Hin on the lower side of the slave medium 2 is insufficient, it is necessary to turn over the slave medium 2 and to initially magnetize the magnetic layers on the opposite sides of the slave medium 2 in sequence.

Then, the master information carriers 3 and 4 and the slave medium 2 are set in the holder 10 with the lower master information carrier 3 and the upper master information carrier 4 respectively in close contact with the lower and upper magnetic layers of the slave medium 2 and the holder 10 is set to the transfer magnetic field application system 11. Each of the electromagnet units 60a and 60b opposed to the upper and lower surfaces of the holder 10 generates a transfer magnetic field Hdu in a direction opposite to the initial DC magnetic field. The transfer magnetic field Hdu is applied to over the entire area of the recording tracks by rotating the holder 10 relatively to the magnetic field once or more in the direction of arrow A, whereby the information represented by the irregularity patterns on the master information carriers 3 and 4 are magnetically transferred to the slave medium 2.

Figure 4A:
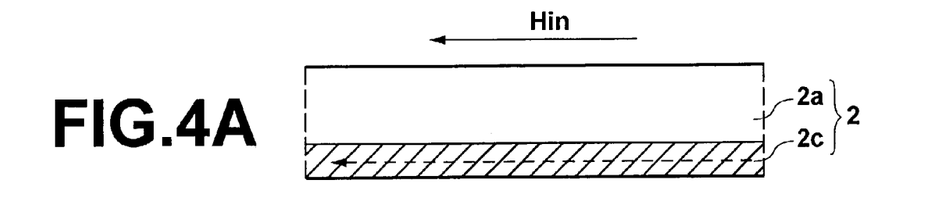
FIGS. 4A to 4C are views for illustrating basic steps of magnetic transfer.
Figure 4B:
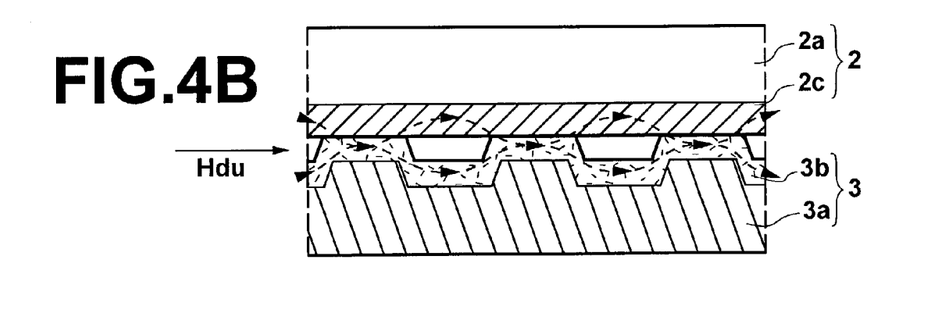
Figure 4C:
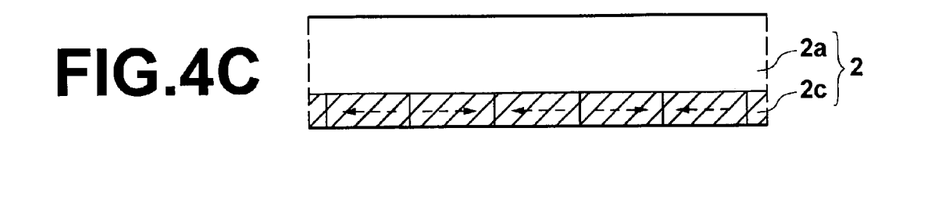

The magnetic transfer will be described in more detail with reference to FIGS. 4A to 4C, hereinbelow. In FIGS. 4A to 4C, only the lower magnetic layer 2b and the lower master information carrier 3 are shown.

An initial DC magnetic field Hin is applied to the slave medium 2 to magnetize the magnetic layers 2b and 2c of the slave medium 2 in a direction parallel to the recording tracks as shown in FIG. 3A.

Thereafter, the magnetic layer 3b of the lower master information carrier 3 and the magnetic layer 4b of the upper master information carrier 4 are brought into close contact with the lower and upper magnetic layers of the slave medium 2 by the holder 10. In this state, the holder 10 together with the slave medium 2 and the master information carriers 3 and 4 in close contact with opposite sides of the slave medium 2 is positioned in place between the upper and lower electromagnet units 60a and 60b of the transfer magnetic field application system 11 each generating a transfer magnetic field Hdu in a direction opposite to the initial DC magnetic field as shown in FIG. 3B, thereby effecting magnetic transfer. As a result, the information represented by the irregularity pattern on each of the upper and lower master information carriers 3 and 4 is recorded on each of the magnetic layers 2b and 2c of the slave medium 2 as a magnetization pattern as shown in FIG. 4C.

In the case where the irregularity pattern representing information to be transferred is a negative pattern reverse to the positive pattern shown in FIGS. 4A to 4C, the information can be magnetically transferred to the slave medium 2 by reversing the directions of the initial DC magnetic field Hin and the transfer magnetic field Hdu.

Figure 5:
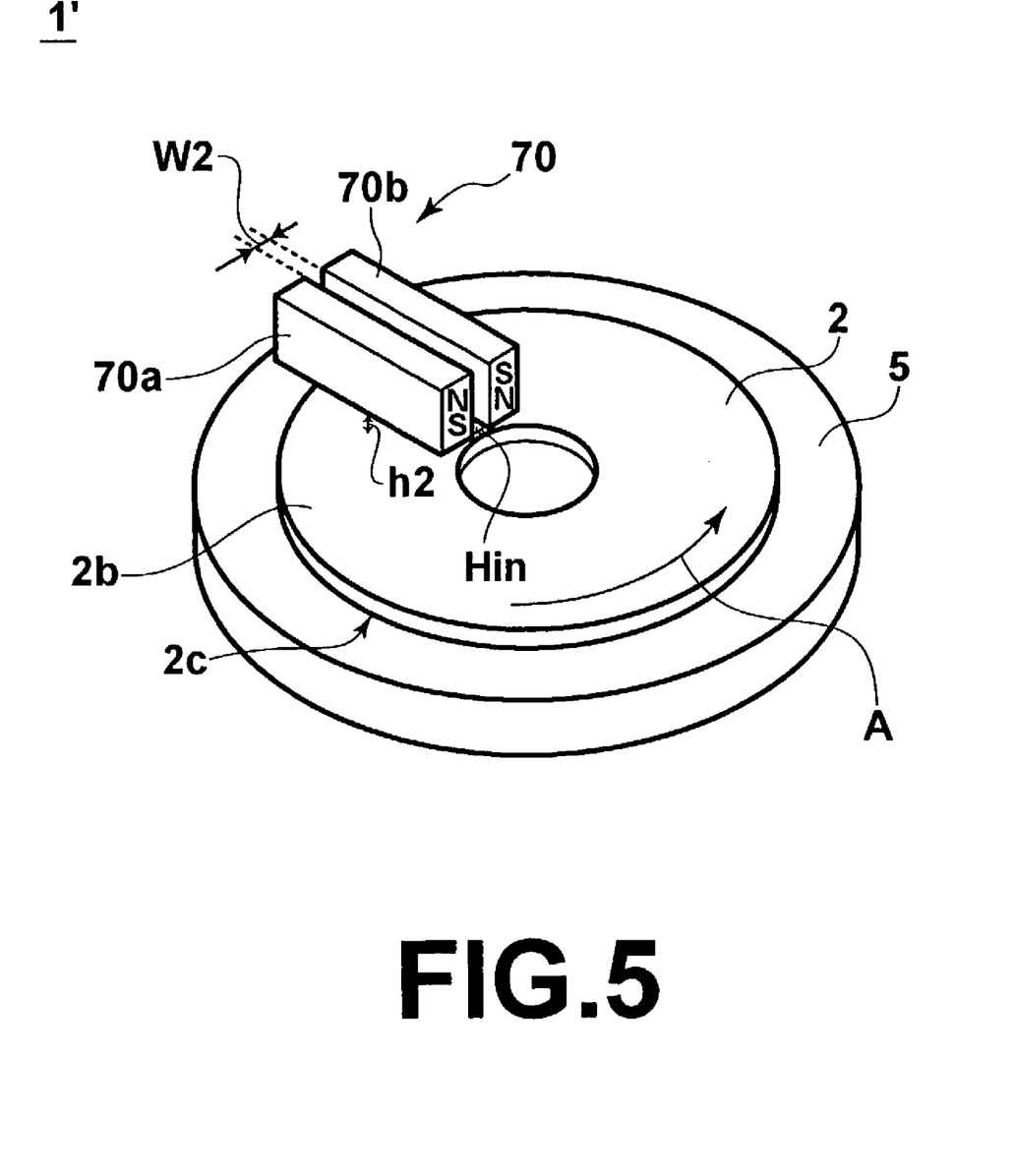
FIG. 5 is a fragmentary perspective view showing an important part of the initial magnetization system employed in a magnetic transfer apparatus for carrying out a method of magnetic transfer in accordance with a second embodiment of the present invention.

FIG. 5 is a fragmentary perspective view showing an initial magnetization system 1' employed in a magnetic transfer apparatus for carrying out a method of magnetic transfer in accordance with a second embodiment of the present invention. The initial magnetization system 1' shown in FIG. 5 differs from that 1 shown in FIG. 1 in that a pair of permanent magnets 70a and 70b is employed as a magnetic field generator in place of an electromagnet unit 50.

That is, the initial magnetization system 1' has a magnetic field generator 70 comprising a pair of permanent magnets 70a and 70b which are magnetized in a direction substantially perpendicular to the upper side 2b of the slave medium 2 and radially extend from an innermost track to an outermost track of the slave medium 2 so that opposite poles of the respective permanent magnets 70a and 70b are opposed to the surface of the slave medium 2. Also, in this initial magnetization system 1', the permanent magnets 70a and 70b are directly opposed to the slave medium 2 and the magnetic field generated between the permanent magnets 70a and 70b is directly applied to the slave medium 2.

The permanent magnets 70a and 70b generates an initial DC magnetic field Hin in parallel to the direction of the recording tracks. Accordingly, by rotating the slave medium 2 once or more relatively to the permanent magnets 70a and 70b, the initial DC magnetic field Hin can be applied to over the entire area of the slave medium 2.

As in the first embodiment described above, the intensity of the initial DC magnetic field Hin applied to the slave medium 2 is set to be not weaker than twice the coercive force Hc of the magnetic layer of the slave medium 2.

This can be realized, for instance, by setting the distance w2 between the permanent magnets 70a and 70b to be not larger than 10 mm and the distance h2 between the upper side of the slave medium 2 and the permanent magnets 70a and 70b to be not larger than 5 mm (preferably 3 mm).

Figure 6:
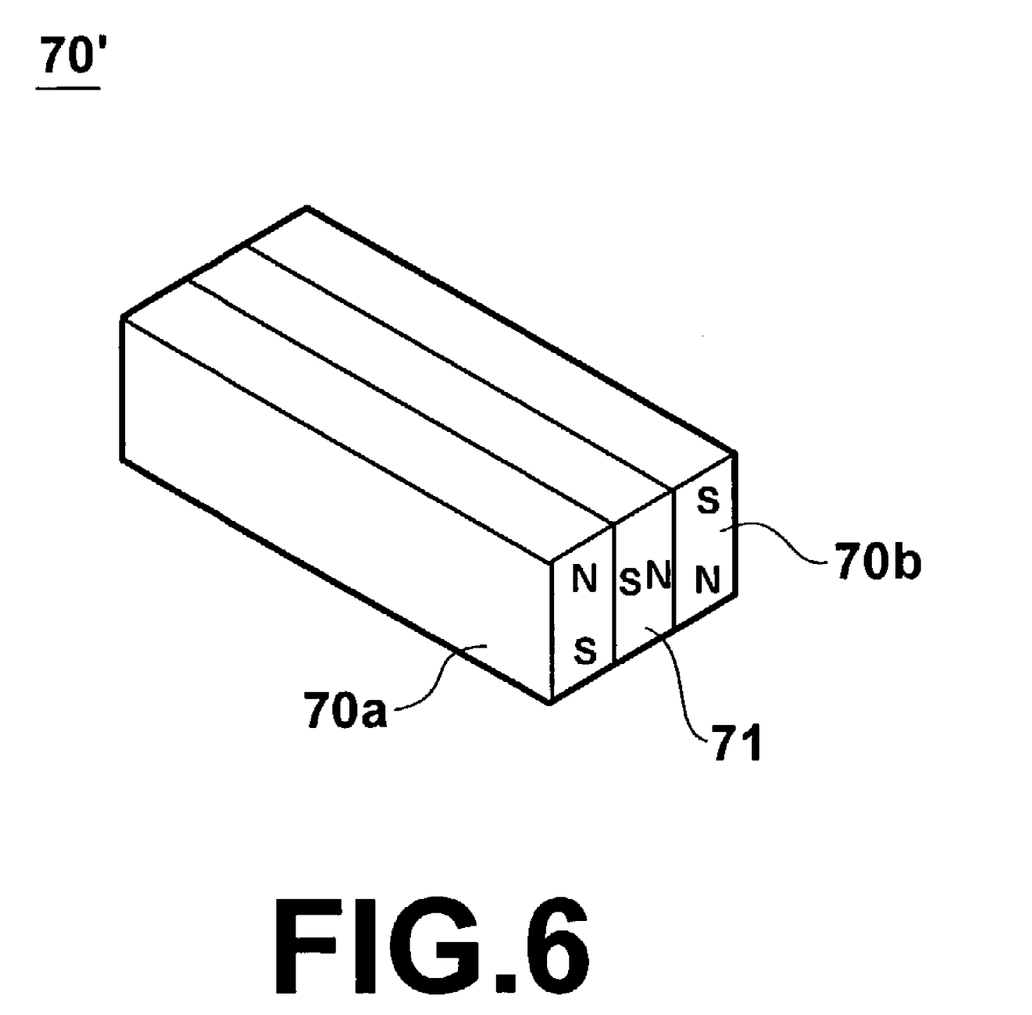
FIG. 6 is a perspective view showing a modification of the magnetic field generator employed in the initial magnetization system shown in FIG. 5.

A third permanent magnet 71 magnetized in a direction perpendicular to the direction of magnetization of the permanent magnets 70a and 70b may be inserted between the permanent magnets 70a and 70b so that the third permanent magnet 71 generates a magnetic field directed in the same direction as the magnetic field generated by the permanent magnets 70a and 70b, as in a magnetic field generator 70' shown in FIG. 6. The magnetic field generated by the third permanent magnet 71 enhances the magnetic field generated by the permanent magnets 70a and 70b.

Though, in the embodiments described above, the slave medium (or the holder) is rotated relatively to the magnetic field generator to apply the magnetic field to over the entire area of the slave medium 2, it is possible to rotate the latter relatively to the former.

Further, though, in the embodiments described above, the surface of the slave medium (or the slave medium/master information carrier assembly) is held horizontal but the surface may be held vertical with the magnetic field generator opposed to the surface.

What is claimed is:

1. A method of magnetic transfer for magnetically transferring information represented by a pattern of a magnetic layer formed on a master information carrier to a magnetic layer of a slave medium comprising the steps of
applying an initial DC magnetic field to the slave medium by a magnetic field generator to initially magnetize the magnetic layer of the slave medium in one direction of recording tracks and
applying a transfer magnetic field to the slave medium and the master information carrier by a magnetic field generator in the direction opposite to the direction of the initial-magnetization with the initially-magnetized magnetic layer of the slave medium held in close contact with the magnetic layer on the master information carrier, wherein the improvement comprises that
the initial DC magnetic field is applied to the slave medium with the slave medium supported from one side thereof so that the other side of the slave medium is directly opposed to the magnetic field generator, and
the transfer magnetic field is applied to the slave medium and the master information carrier held in close contact with each other so that the initially-magnetized magnetic layer of the slave medium held in close contact with the magnetic layer on the master information carrier by a holder, which covers both the sides of the slave medium/master information carrier assembly, with the magnetic field generator positioned to oppose both the sides or one side of the slave medium/master information carrier assembly so that the magnetic field generated by the magnetic field generator is applied to the slave medium and the master information carrier through the holder.

2. A method of magnetic transfer as defined in claim 1 in which the intensity of the initial DC magnetic field is set to be not lower than the coercive force of the magnetic layer of the slave medium.

3. A method of magnetic transfer as defined in claim 2 in which the intensity of the initial DC magnetic field is set to be not lower than 1.2 times the coercive force of the magnetic layer of the slave medium.

4. A method of magnetic transfer as defined in claim 3 in which the intensity of the initial DC magnetic field is set to be not lower than twice the coercive force of the magnetic layer of the slave medium.

5. A method of magnetic transfer as defined in claim 1 in which the intensity of the transfer magnetic field is set to be not lower than about 0.6 times the coercive force of the magnetic layer of the slave medium and not higher than about 1.3 times the coercive force of the magnetic layer of the slave medium.

6. A method of magnetic transfer as defined in claim 1 in which the magnetic field generator comprises an electromagnet unit.

7. A method of magnetic transfer as defined in claim 1 in which the magnetic field generator comprises a permanent magnet unit.

* * * * *